INVENTORS.
JAMES M. BOOE
JOSEPH T. HOOD
BY Robert Levine
ATTORNEY

INVENTORS
JAMES M. BOOE
JOSEPH T. HOOD
BY
ATTORNEY

United States Patent Office 3,465,402
Patented Sept. 9, 1969

3,465,402
ELECTRICAL CAPACITOR FOR USE IN ADVERSE ENVIRONMENTS AND METHOD OF MAKING THE SAME
James M. Booe and Joseph T. Hood, Indianapolis, Ind., assignors to P. R. Mallory & Co., Inc., Indianapolis, Ind., a corporation of Delaware
Original application Jan. 11, 1961, Ser. No. 81,979, now Patent No. 3,278,815, dated Oct. 11, 1966. Divided and this application July 28, 1965, Ser. No. 485,964
Int. Cl. H01g 13/00, 1/00
U.S. Cl. 29—25.42                                             12 Claims

ABSTRACT OF THE DISCLOSURE

A method is provided for making a capacitor assembly which includes a ceramic cylindrical insulating tube containing longitudinally stacked therein a plurality of conductive disc electrodes interleaved with respective layers of compacted powder ceramic insulating materials.

---

Figure 1:
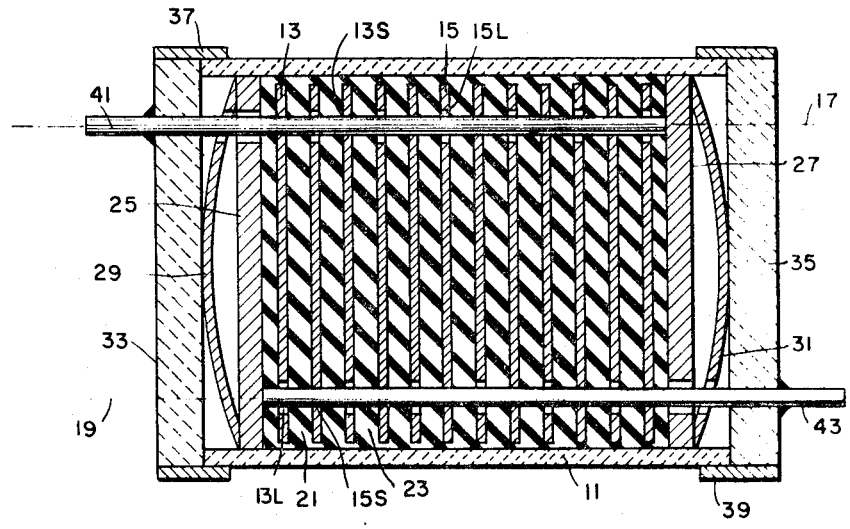

This is a division of application Ser. No. 81,979, filed Jan. 11, 1961, now United States Patent 3,278,815.

This invention relates to electrical capacitors capable of withstanding extremely adverse environmental conditions of temperature and nuclear radiation, and is particularly concerned with capacitors which employ compacted powdered insulating materials to achieve such capability. The invention further relates to methods by which capacitors of this type may be constructed.

In many different areas of modern technology electrical and electronic components are required which can withstand environmental conditions of heretofore prohibitive severity. For example, in jet aircraft and spacecraft such components may have to withstand temperatures ranging from —150° F. up to nearly 1,000° F. In nuclear power applications conditions of equally high temperatures as well as intense bombardment by neutron and gamma rays may be encountered. Although extensive effort has been devoted to developing components adapted for use under these and similarly rigorous conditions the results as yet have been quite limited, e.g. ceramic vacuum tubes and a few types of transformers.

The development of an electrical capacitor capable of operating at temperatures up to about 1,000° F. is a particularly difficult problem because the insulating material employed must provide a higher order of dielectric performance than required in any other type of circuit component. Since the resistivity and dielectric strength of all known insulating materials rapidly decrease with increasing temperature, prior attempts to construct such a capacitor have fallen far short of the foregoing temperature level.

Accordingly, an object of the invention is to provide an electrical capacitor which retains both high insulation resistance and high dielectric strength under extremely adverse environmental conditions of temperature and exposure to nuclear radiation.

A further object is to provide an electrical capacitor employing a compacted powdered ceramic insulating material and a physical structure rendering it capable of withstanding highly adverse environmental conditions.

A further object is to provide methods of making a capacitor structure comprising a compacted powdered ceramic insulating material and which is capable of withstanding highly adverse environmental conditions.

In one embodiment of an electrical capacitor in accordance with the invention, capable of withstanding highly adverse environmental conditions, it comprises a cylindrical insulating tube with a plurality of conductive disc electrodes stacked in longitudinal succession therein. A plurality of layers of insulating material are respectively interleaved between and separate successive ones of the electrodes from each other. The capacitor further comprises a pair of conductive cylindrical bars longitudinally extending within the insulating tube and respectively passing through alternate ones of the electrodes so as to make peripheral electrical contact therewith, the periphery of each bar being transversely spaced from the electrodes in contact with the other bar. A pair of seals affixed at opposite ends of the tube retain the stack of electrodes and layers of insulating material therein, each of the cylindrical bars longitudinally extending through at least one of the seals so as to provide together a pair of connection terminals for the capacitor.

Further in accordance with the invention, a method is provided for making a capacitor assembly which includes a ceramic cylindrical insulating tube containing longitudinally stacked therein a plurality of conductive disc electrodes interleaved with respective layers of compacted powdered ceramic insulating material. One such method comprises supporting the insulating tube under substantially uniform radial compression over the outer surface thereof. Respective ones of the conductive disc electrodes are then stacked into the tube interleaved with respective layers of the ceramic insulating material. The method additionally comprises compacting each of the foregoing layers by exerting longitudinal pressure thereon, following which the supporting radial compression is removed from the tube. Depending on the insulating material employed, in some cases the foregoing process may additionally include subjecting the stack of electrodes and compacted layers of insulating material to longitudinal pressure while heating the tube under partial vacuum so as to effect further compacting and consolidation of the complete stack. When the insulating material is a mixture of powdered ceramic dielectric material and powdered fusible binder material, the foregoing vacuum heating operation will cause the binder material to liquefy. Upon cooling it will then bond with the powdered dielectric material into a substantially solid integral mass.

Figure 2:
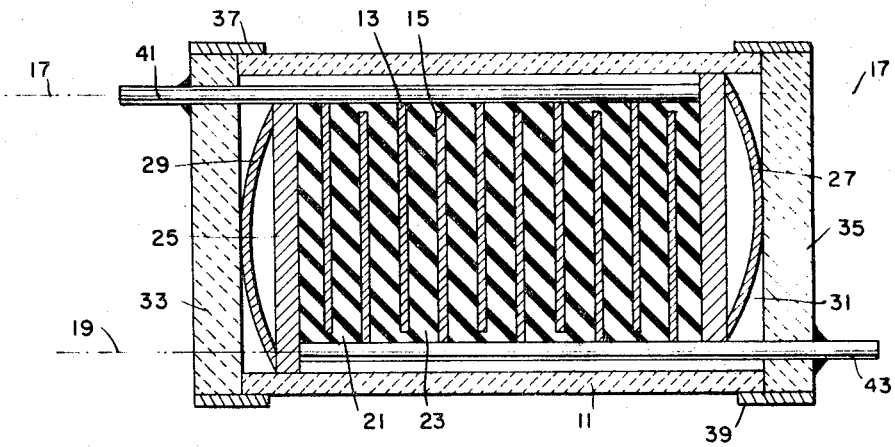
Figure 3:
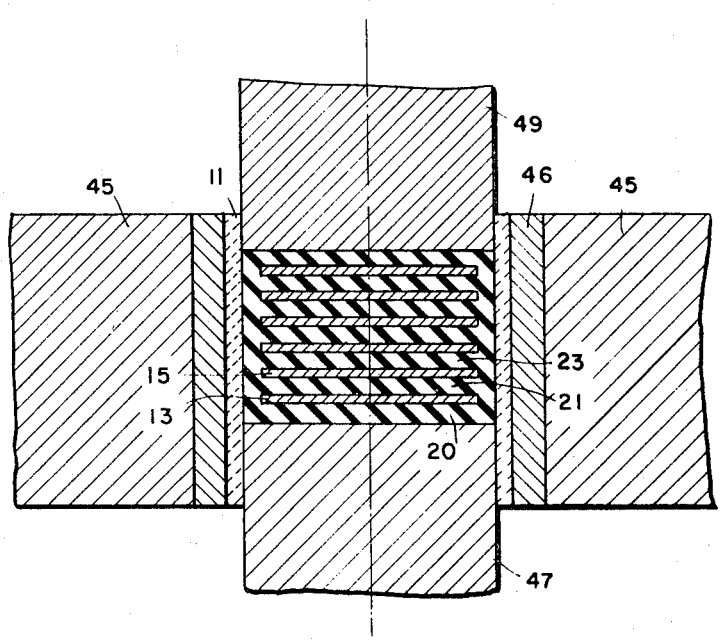

A more detailed description of capacitors and processes in accordance with the invention is presented in the following specification and accompanying drawings, but it should be noted that the true scope of the invention is actually pointed out in the ensuing claims. In the drawings:

FIG. 1 is a sectional view of one type of capacitor constructed in accordance with the invention;

FIG. 2 is a sectional view of another type of capacitor constructed in accordance with the invention; and FIG. 3 is a diagram illustrative of a method in accordance with the invention for making a capacitor structure which includes a ceramic insulating tube containing therein a stacked assembly of successive layers of powdered insulating material interleaved by successive conductive disc electrodes.

Capacitor electrical characteristics

Capacitor applications impose much greater restrictions on dielectric materials than any other electronic component due to the great area and thin sections involved. Therefore, the dielectric characteristics which favor the choice of a material are:

(a) High specific resistance $R_v$.
(b) High dielectric constant K.
(c) High dielectric strength $S_d$.
(d) Low dielectric loss (dielectric absorption and dielectrical hysteresis).

These characteristics affect the size, weight and cost as well as the quality of a capacitor. Their relative importance varies with the voltage and capacitance rating and the environmental and application requirements for which the capacitor is intended. The type of capacitor to which the present invention is primarily directed is one capable of operation at relatively high voltages (up to about 3,000 volts) and high temperatures (up to about 500° C.) at nominal capacitance of the order of a few microfarads.

The size and weight of a capacitor, as well as the quantity of material employed, are effected by the dielectric constant K and dielectric strength $S_d$ of the dielectric material employed. However, in the case of a capacitor having a relatively high voltage rating the value of $S_d$ is of far greater importance than a high K value.

The insulation resistance $R_i$ (ohm-microfarads) of a capacitor is independent of the thickness of the dielectric employed for any specific dielectric material, as may be seen from the fact that the ohmic resistance R is given by $$R = R_v T/A \qquad (1)$$

and the capacitance C is given by $$C = \frac{8.85 \times 10^{-8} K \times A}{T} \text{ microfarad} \qquad (2)$$

where $R_v$ is the volume resistivity of the dielectric material in ohm-centimeters, T is its thickness in centimeters, A is the total area in square centimeters, and K is the dielectric constant. Taking the product of R and C, which is the insulation resistance $R_i$ $$R_i = RC = 8.85 \times 10^{-14} K \times R_v \text{ megohm-microfarads} \qquad (3)$$

From Equation 3 it is clear that the insulation resistance $R_i$, is completely determined by the dielectric constant K and the specific resistivity $R_v$, and is not effected by the thickness of the dielectric. The thickness of the dielectric does, however, effect the breakdown voltage $V_b$ of the capacitor in accordance with the relation.

$$V_b = T \times S_d$$

The volume and weight of dielectric material required for any specified product of voltage and capacitance, or insulation resistance, will therefore be inversely proportional to the square of the dielectric strength ($V_b^2$).

The foregoing considerations lead to the conclusion that a dielectric material of high specific resistivity and high dielectric strength at elevated temperatures will be preferable for the purposes of the present invention to a dielectric material having a higher dielectric constant but lower dielectric strength. Thus, although the dielectric constant of boron nitride (BN) is only about 4, while other dielectric materials such as aluminum oxide ($Al_2O_3$) may have dielectric constants of 9 or more, boron nitride is preferable because it has a far higher specific resistivity and dielectric strength at 500° C. than any other presently known material.

Capacitor structure

Referring now to FIG. 1, there is illustrated an embodiment of a capacitor which, in accordance with the invention, is capable of withstanding highly adverse environmental conditions. It comprises a cylindrical insulating tube 11 of a material possessing high dielectric strength, ability to withstand high temperatures, and reasonable mechanical strength. Ceramics such as forsterite, quartz, steatite and alumina are each satisfactory, with alumina having been found preferable. Stacked in longitudinal succession within tube 11 are a plurality of conductive disc electrodes 13, 15, etc. These should have flat transverse surfaces and preferably be very thin (i.e. 0.002 inch thick) in order to provide good heat dissipation in the longitudinal direction. They should be constructed of metals having low thermal expansion, high mechanical strength, and good brazability. Steel, stainless steel, nickel, iron, Monel, Inconel, molybdenum, and tantalum have been found satisfactory, with tantalum being preferred for its highly refractory characteristics when hot pressing is employed as described hereinafter. All of the disc electrodes may be of the same transverse configuration and may each bear a longitudinal aperture therein of the same transverse dimensions, the electrodes being stacked so the apertures of successive ones thereof are alternately aligned on opposite ones of a pair of transversely separated longitudinal axes. More specifically, as illustrated by the construction in FIG. 1, each disc electrode may bear a larger and a smaller longitudinal aperture therein respectively of transverse dimensions and at relative transverse spacings which are the same for all electrodes. These apertures are preferably located adjacent dimetrically opposite portions of the periphery of each electrode. The electrodes are longitudinally stacked in tube 11 so the larger and smaller apertures of successive ones are alternately aligned on opposite ones of the longitudinal axes referred to. For example, the larger and smaller apertures 15L and 15S of electrode 15 are respectively coaxially aligned on longitudinal axes 17 and 19. The immediately preceding electrode 13, on the other hand, has its smaller aperture 13S aligned on axis 19 and its larger aperture 13L aligned on axis 17.

The capacitor of FIG. 1 further comprises a plurality of layers of insulating material such as layers 21, 23, etc., in the foregoing stack interleaved between and insulating successive ones of the electrodes from each other. Thus, insulating layer 21 is interleaved between and separates successive electrodes 13 and 15 from each other. These layers preferably extend completely to the interior surface of tube 11, filling all the space in the tube between the electrodes. Each insulating layer may have a pair of longitudinal apertures drilled therein respectively aligned on the longitudinal axes 17 and 19 and of the same transverse dimensions as the smaller electrode apertures, each layer comprising a powdered dielectric which has been compacted to a predetermined density. More specifically, the insulating material employed may be a compacted powdered ceramic dielectric selected from the class consisting of the oxides and nitrides of magnesium, aluminum, silicon and boron. As indicated above, boron nitride is preferable because it has high insulation resistance and adequate mechanical strength at high temperatures even when compacted to only about 80 percent of its theoretical density of 2.1 gm./cc. This is important because when compacting is achieved by cold pressing the powdered material considerable bursting is placed on ceramic tube 11. If the pressure is too high it may cause the tube to fracture. The powder employed must therefore attain the requisite characteristics at the density permitted by the maximum compacting pressure which tube 11 can withstand. This limits the choice of suitable dielectric, since the great majority of those capable of high temperature performance suffer markedly in insulating properties unless in a substantially non-porous almost solid condition. In order to alleviate the high compacting pressures required, thereby placing less stress on insulating tube 11, each layer of insulating material may comprise a mixture of powdered ceramic dielectric material such as boron nitride with a fusible powdered binder material, such mixture having been bonded together into a substantially solid integral mass. A hot pressing process for achieving such fabrication is described in more detail hereinafter. The powdered binder material should have the properties of reasonably low melting point, good dielectric performance, and the facility of bonding to the dielectric powder so that upon cooling and solidification the latter is bonded into a substantially solid mass. Binder materials selected from the class of compounds of boron and oxygen have been found to serve very well, boron oxide and magnesium orthoborate being preferable. These binders may be used not only with the preferred boron nitride dielectric, but also with any of the other dielectrics in the class indicated above.

To retain the stacked assembly of disc electrodes and insulating layers, as described, a pair of seals may be affixed at opposite ends of insulating tube 11. Such seals are preferably adapted to exert longitudinal pressure on the stacked assembly in order to prevent mechanical displacement or delamination due to temperature cycling shock or vibration. They may respectively comprise respective ones of a pair of rigid metal terminal plates 25 and 27 journalled within opposite ends of tube 11 against the corresponding ends of the stacked assembly therein. The plates are respectively held in place by respective ones of a pair of disc or spider spring washers 29 and 31 which are compressed by respective ones of end caps 33 and 35 which close off the ends of tube 11. For operation at the maximum possible temperatures these springs should be of refractory metals such as "Inconel," tungsten, molybdenum, or tungsten-tantalum alloys. For such operation the end caps 33 and 35 should be made of a ceramic material, but they may be metal when less extreme temperatures and lower breakdown voltage levels are anticipated. The annular peripheral edge of each end cap is preferably hermetically joined to the corresponding end of tube 11 by brazing. For this purpose the annular peripheral ends of tube 11 may be metallized either with a metal or alloy, the peripheral edges of the caps being similarly metallized when ceramic caps are employed. Either as an alternative or supplement to the foregoing mode of cap bending, the ends of tube 11 may be respectively provided with short metal sleeves or rings 37 and 39 bonded to and slightly projecting therefrom. End caps 33 and 35 can then be respectively fitted within and brazed to the inner surface of such rings or sleeves.

The capacitor of FIG. 1 additionally comprises a pair of conductive cylindrical connecting bars 41 and 43 longitudinally extending within tube 11 and respectively passing through alternate ones of the stacked electrodes so as to make peripheral electrical contact therewith, the periphery of each bar being transversely spaced from the electrodes in contact with the other bar. Each connecting bar also extends through at least one of the end seals of tube 11 so as to provide together a pair of connection terminals for the complete capacitor. More specifically, as shown in FIG. 1 the bars 41 and 43 may respectively extend coaxial along longitudinal axes 17 and 19 through the electrode apertures on the corresponding axis and through opposite ones of the end seals of tube 11. In order to achieve good electrical contact with the appropriate alternate electrodes, the transverse cross-section of each of connecting bars 41 and 43 may be of nearly the same dimensions as the smaller electrode apertures so that it tightly journals the electrodes whose smaller apertures are on its axis. The periphery of each bar thus be transversely spaced from contact with the electrodes whose larger apertures lie on its axis. For this reason each bar will necessarily have to be very straight. In addition, assuming that the electrode apertures are circular, the diameter of the bars must be very precise so as to assure good peripheral contact. A more positive mode of effecting good electrical contact may be to provide each connecting bar with a smooth uniform coating of a suitable brazing metal or alloy having a melting point below that of the bars and the electrodes. The stacked assembly may then be heated in a furnace or induction coil to melt the brazing alloy, thereby bonding the edges of each of the smaller electrode apertures to the connecting bar journalled therein. The connecting bars may be made of the same metals or alloys as the disc electrodes. For surface brazing thereof they may be coated with metals or alloys such as nickel phosphide, copper or copper alloys, copper-titaminum hydride powder, and gold and gold alloys may be employed. Silver or silver alloys are not recommended because of the danger of silver migration due to local electrolytic action. It is plain that each connecting bar and the smaller aperture in each electrode may be correspondingly threaded to insure good contact before effecting brazing as described. It is also apparent that the apertures and the connecting bars can have other than circular transverse shapes, e.g. oblong, flat or cruciform.

The capacitor structure of FIG. 1 is particularly adapted to use identical circular disc electrodes of slightly smaller diameter than the inner wall of a circular cylindrical insulating tube 11, all the electrodes being coaxially stacked within the tube and each bearing two apertures therein which are preferably diametrically opposite and adjacent the edge of the electrode. However, it is equally feasible to construct basically the same type of capacitor structure with electrodes which have only one or even no apertures therein. Thus, in the capacitor structure shown in FIG. 2 the disc electrodes have no apertures and are not all coaxial with each other within the insulating tube 11.

Capacitor of FIG. 2

The capacitor of FIG. 2 is closely similar to that of FIG. 1, corresponding elements having been similarly identified. However, in the structure employed in FIG. 2 the longitudinal connecting bars 41 and 43 respectively extend within tube 11 coaxially along londitudinal axes 17 and 19 which are adjacent diametrically opposite portions of the inner wall of the tube, the portion of the surface of each bar adjacent the wall preferably being bonded thereto. The various disc electrodes 13, 15, etc., are all of the same transverse dimensions and are longitudinally stacked within tube 11 so the peripheral edges of successive ones thereof are in transverse contact with alternate ones of connecting bars 41 and 43. In each case they are transversely separated from contact with the remaining connecting bar. Thus, the peripheral edge of electrode 13 transversely abuts connecting bar 41 but no portion of its periphery touches connecting bar 43. The peripheral edge of the succeeding electrode 15 transversely abuts connecting bar 43 but no portion of its periphery touches connecting bar 41. As in FIG. 1, a plurality of layers 21, 23, etc., of insulating material are interleaved between and insulate successive ones of the stacked disc electrodes from each other.

It is clear that this capacitor construction is simpler than that of FIG. 1. Besides dispensing with the apertures in the disc electrodes, no apertures are required in the terminal plates 25 and 27 or spring washers 29 and 31 comprised in the seals at opposite ends of tube 11. The omission of electrode apertures also results in maximum utilization of the available surface area of each electrode to contribute to the resultant total capacitance. However, it must be recognized that this type of construction results in considerably less insulation thickness in the electrical path between each successive pair of electrodes than in the type of construction in FIG. 1. Consequently, this embodiment of the invention is not adapted for use at as high voltages and temperatures as that of FIG. 1.

Method of FIG. 3

The invention is also directed to providing a method of making a capacitor assembly which, as described, includes a ceramic cylindrical insulating tube containing longitudinally stacked therein a plurality of conductive disc electrodes interleaved with respective layers of compacted powdered ceramic insulating material. Such a method may comprise supporting the insulating tube under substantially uniform radial compression over the outer surface thereof. This is illustrated in FIG. 3, wherein a longitudinally extending circular cylindrical insulating tube 11 is shown placed vertically within a surrounding circular steel die 45, there being an annular space 46 between the outer wall of the tube and the inner wall of the die. A molten expandable metal such as one of the Cerro de Pasco alloys or bismuth is poured in the annular space 46 and allowed to solidify. This places the tube 11 under uniform radial compression and supports it during the subsequent compacting operations.

The method also comprises successively stacking respective ones of the conductive disc electrodes 13, 15, etc., into tube 11 interleaved with respective layers 20, 21, 23, etc., of powdered ceramic insulating material. These layers are compacted by exerting longitudinal pressure thereon, after which the supporting radial compression is removed from tube 11 by melting the metal in space 46. One technique by which the requisite compacting may be effected is to employ layers of insulating material which have been individually cold pressed into respective wafer compacts. Then, after being interleaved between the stacked disc electrodes in tube 11, the entire stack may be subjected to longitudinal pressure while heating the tube in a vacuum furnace. This serves to further compact the cold pressed wafers and to consolidate the stack. Another compacting technique, which does not employ hot pressing, is to successively stack respective electrodes and respective loosely powdered layers of ceramic insulating material into tube 11, each such layer then being subjected to longitudinal pressure to compact it after being stacked in the tube and prior to stacking the succeeding layer therein. This type of cold pressing may be effected as shown in FIG. 3, wherein a lower ram press 47 is extended within tube 11 to a level adjacent the upper end thereof and is successively translated in incremental steps toward the lower end of the tube until withdrawn therefrom. One of the disc electrodes and one layer of the powdered insulating material are stacked in tube 11 through the upper end thereof prior to each successive translation of press 47. The electrodes and layers thus stacked in the tube are pressed against press 47 after each translation thereof so as to compact each newly stacked layer to a predetermined density, the stack of electrodes and layers already in tube 11 being incrementally translated with press 47 toward the opposite end of tube 11. Such pressing may be effected by bringing a mating upper ram press 49 to bear against the last stacked electrode and powdered layer after translating lower press 47. To illustrate, lower ram press 47 may be positioned prior to the first of its incremental translations so as to leave a narrow laminar space within tube 11 adjacent the upper end thereof. This space is then filled with the powdered insulating material employed, such as magnesium oxide, aluminum oxide, silica, or the preferred boron nitride, the excess powder being scraped off level with the end of the tube. The upper ram press 49 is then brought to bear on the layer of insulating material and pressure is exerted thereon to compact it to a predetermined density. This also translates the electrodes and layers already in tube 11 toward the lower end thereof so that the stack is again in contact with the lower press 47. Upper press 49 is then raised clear of tube 11, and all operations are repeated for another layer of insulating material. The respective disc electrodes 13, 15, etc., may be successively placed within the tube either before or after each new loading of insulating material, the only essential requirements being that successive electrodes be in proper alignment. Thus, if the capacitor structure is to be as in FIG. 1 the apertures of successive electrodes must be accurately coaxial. When the capacitor structure is to be as in FIG. 2, the peripheral edges of successive electrodes must be lined up so that diametrically opposite portions thereof are colinear along respective diametrically opposite longitudinal axes adjacent the inner wall of tube 11.

For uniform thickness of each layer of insulation each incremental translation of lower ram press 47 should equal the combined thickness of one disc electrode and one compacted layer of insulating material. Upon completion of the stacking, translating and compacting operations tube 11 will be nearly filled, both ram presses being removed therefrom while there is still sufficient space at each end to accommodate the end seals described above. The tube is then freed from die 45 by melting the solidified expandable alloy which had been in the annular space 46. The terminal plates 25 and 27 of the two end seals are next inserted, each bearing an aperture therein coaxial with the corresponding one of longitudinal axes 17 and 19 in FIG. 1 or 2 and of substantially the same diameter as the electrode connecting bars. Since during the compacting operation the longitudinal space to be occupied by the connecting bars will have become filled with the powdered ceramic insulating material, this material must be drilled therefrom prior to insertion of the bars. Drilling may be effected along each of the longitudinal axes of the connecting bars through the apertures in the terminal plates 25 and 27, which are meanwhile held in place by a C clamp or other means, and is continued up to the opposite terminal plate. It will be appreciated that in the case of the capacitor structure of FIG. 1 the compacted powder will continue to fill the annular space in each of the larger electrode apertures in excess of that in each of the smaller electrode apertures.

The foregoing capacitor structure may be utilized to produce a complete capacitor by inserting the connecting bars therein along the respective longitudinal axes 17 and 19. Assuming that the bars are coated with a smooth layer of brazing metal or alloy, as mentioned above, they may be bonded to the electrodes by heating in a furnace or induction coil until the brazing alloy melts and bonds to the contacting portions of the electrodes.

Since the compacted insulating layers may be somewhat porous, air will be contained in the interstices. This should be removed prior to brazing the connectnig bars, which can be effected by placing the stacked assembly including the connecting bars into a furnace having a hydrogen or inert gas attmosphere and raising the temperature to a point below that at which the brazing material fuses. After a sufficient period for the air to have been removed the temperature is then further raised to effect brazing. It is preferable, however, to remove the air by means of a vacuum pump prior to introducing the hydrogen or inert gas, after which the temperature may be directly raised to the brazing point.

After making the brazed contact between the connecting bars and the disc electrodes the spring washers 29 and 31 and end caps 33 and 35 are placed at opposite ends of the insulating tube, as described, and held there under mechanical pressure to compress the springs while the peripheral joint between the tube and each end cap is brazed. The apertures in the end caps through which the connecting bars project may also be brazed to the bars. It is desirable to initially provide each of end caps 33 and 35 with a capillary tube longitudinally extending there-through, so that after the foregoing brazing operations the complete sealed assembly may be evacuated and, if desired, filled with a moisture-free inert gas such as nitrogen, argon or helium. The capillary gas tubes can then be welded closed.

Up to this point the process for making a capacitor structure in accordance with the invention has been described as one wherein the powdered ceramic insulating material is compacted by cold pressing operations. Dry cold-pressed powdered insulating materials selected from the class consisting of the oxides or nitrides of aluminum, magnesium, silicon and boron, and especially boron nitride, give very god high temperature and high voltage performance. This is particularly true if the air and moisture are removed from the pores of the compacted powder layers or if the interstices in the powder are filled with a dry inert gas as described. However, construction of capacitors employing cold pressed powder subjects the ceramic insulating tube to considerable bursting stress during the compacting operation, thus limiting the degree of compacting pressure which may be employed. In some cases this may be inadequate to compact the powder to a sufficiently high density to obtain the performance which it is otherwise capable of providing. In addition, dry powder may be susceptible to delamination under conditions of temperature cycling, vibration and shock.

To avoid the foregoing shortcomings of cold pressed insulating powder, the insulating material employed in a capacitor structure in accordance with the invention may be a mixture of a powdered ceramic dielectric material with a powdered fusible binder material having good dielectric properties. Boron oxide has been found to serve very well for bonding boron nitride dielectric powder, but may also be used to bond other dielectric powders such as magnesium oxide, aluminum oxide, etc. Another compound of boron and oxygen, magnesium orthoborate, gives equally good results at even higher temperatures than boron oxide. However, the melting point of magnesium orthoborate is about 1,366° C. as compared with about 475° C. for boron oxide, so that a far higher fusing temperature will be required. The preferred amount of boron oxide powdered binder material is in the range of 5% to 25% by weight of the composite mixture thereof with the powdered dielectric employed. The corresponding preferred amount of magnesium orthoborate is 5% to 50% by weight.

A capacitor structure employing an insulating material comprising a fused mixture of powdered ceramic dielectric and powdered fusible binder materials may be constructed by first making a cold pressed structure by the method described above, except that a lower cold compacting pressure can be employed. The temperature of the tube and the composite stacked assembly of electrodes and compacted layers of insulating material therein is then raised until the binder material liquefies and flows together with the dielectric material in each layer. The tube is then cooled, so that the binder material bonds with the powdered dielectric material into a substantially solid integral mass therein. These operations may be effected by transferring the insulating tube to a vacuum furnace after completing stacking and compacting the layers of insulating material and disc electrodes. The furnace is then evacuated to remove air and moisture, and the temperature is raised until the binder material liquefies and flows together with the dielectric powder. Longitudinal pressure may be simultaneously applied to the stack to consolidate the entire assembly. The insulating tube is then permitted to cool, resulting in a hard, rigid complete structure which may be drilled, as before, to provide for insertion of the connecting bars along the respective longitudinal axes. Alternatively, insertion of the connecting bars may be effected prior to the furnace fusing operation.

Although the invention has been described with reference to various specific embodiments thereof, both as to its structure and method, it will be apparent to those skilled in the art that many modifications and variations may be employed without departing from the true teachings and scope of the invention as defined by the ensuing claims.

What is claimed is:

1. The method of making a capacitor assembly which includes a ceramic cylindrical insulating tube containing longitudinally stacked therein a plurality of conductive disc electrodes interleaved with respective layers of compacted powdered ceramic insulating material, said method comprising: supporting said insulating tube under substantially uniform radial compression over the outer surface thereof; successively stacking respective ones of said conductive disc electrodes into said tube interleaved with respective layers of said ceramic insulating material; compacting each of said layers by exerting longitudinal pressure thereon; and removing the supporting radial compression from said tube.

2. The method of making a capacitor assembly which includes a ceramic cylindrical insulating tube containing longitudinally stacked therein a plurality of conductive disc electrodes interleaved with respective layers of compacted powdered ceramic insulating material, said method comprising: successively pressing individual powdered layers of said ceramic insulating material into respective wafer compacts; supporting said insulating tube under substantially uniform radial compression over the outer surface thereof; successively stacking respective ones of said conductive disc electrodes into said tube interleaved with respective ones of said wafer compacts; subjecting the stack of electrodes and wafers in said tube to longitudinal pressure while heating said tube under partial vacuum so as to effect further compacting of said pressed wafers and consolidation of said stack; and removing the supporting radial compression from said tube.

3. The method of making a capacitor assembly which includes a ceramic cylindrical insulating tube containing longitudinally stacked therein a plurality of conductive disc electrodes interleaved with respective layers of compacted powdered ceramic insulating material, said method comprising: supporting said insulating tube under substantially uniform radial compression over the outer surface thereof; successively stacking respective ones of said conductive disc electrodes into said tube interleaved with respective powdered layers of said ceramic insulating material; successively subjecting each of said powdered layers to longitudinal pressure to compact it after being stacked within said tube and prior to stacking the succeeding layer therein; and removing the supporting radial compression from said tube.

4. The method of making a capacitor assembly which includes a ceramic insulating tube containing longitudinally stacked therein a plurality of conductive disc electrodes interleaved with respective layers of insulating material, said insulating material being a bonded mixture of powdered ceramic dielectrical material and powdered fusible binder material, said method comprising: supporting said insulating tube under substantially uniform radial compression over the outer surface thereof; successively stacking respective ones of said conductive disc electrodes into said tube interleaved with respective layers of a powdered mixture of said dielectric and fusible binder materials; successively subjecting each of said powdered layers to longitudinal pressure to compact it after being stacked within said tube and prior to stacking the succeeding layer therein; removing the supporting radial compression from said tube; subjecting the stack of said electrodes and layers of mixed powdered dielectric and binder materials to longitudinal pressure while heating said tube under partial vacuum until said binder material liquefies and flows together with said dielectric material in each of said layers; and cooling said tube so that said binder material bonds with said powdered dielectric material into a substantial solid integral mass therein.

5. The method of making a capacitor assembly which includes a ceramic cylindrical insulating tube containing longitudinally stacked therein a plurality of conductive disc electrodes interleaved with respective layers of compacted powdered ceramic insulating material, said method comprising: supporting said insulating tube under substantially uniform radial compression over the outer surface thereof; extending a ram press within said tube to a level adjacent one end thereof and successively translating said press in incremental steps toward the opposite end of the tube until withdrawn therefrom; successively stacking one of said conductive disc electrodes and one layer of said powdered insulating material into said tube through said one end thereof prior to each successive incremental translation of said press; successively pressing the electrodes and layers stacked in said tube against said press after each translation thereof so as to compact each newly stacked layer to a predetermined density, the stack of electrodes and layers already in said tube being incrementally translated with said press toward the opposite end thereof; and removing the supporting radial compression from said tube after said press has been withdrawn therefrom.

6. The method of making a capacitor assembly which includes a ceramic insulating tube containing longitudinally stacked therein a plurality of conductive disc electrodes interleaved with respective layers of insulating material, said insulating material being a bonded mixture of powdered ceramic dielectric material and powdered fusible binder material, said method comprising: supporting said insulating tube under substantially uniform radial compression over the outer surface thereof; extending a ram press within said tube to a level adjacent one end thereof and successively translating said press in incremental steps toward the opposite end of the tube until withdrawn therefrom; successively stacking one of said conductive disc electrodes and one layer of said powdered mixture of said dielectric and fusible binder materials into said tube through said one end thereof prior to each successive incremental translation of said press; successively pressing the electrodes and layers stacked in said tube against said press after each translation thereof so as to compact each newly stacked layer to a predetermined density, the stack of electrodes and layers already in said tube being incrementally translated with said press toward the opposite end of said tube; removing the supporting radial compression from said tube after said press has been withdrawn therefrom; subjecting the stack of electrodes and layers of mixed powdered dielectric and binder materials to longitudinal pressure while heating said tube under vacuum until said binder material liquefies and flows together with said dielectric material in each of said layers; and cooling said tube so that said binder material bonds wtih said powdered dielectric material into a substantially solid integral mass therein.

7. The method of making the capacitor assembly of claim 2, wherein said conductive disc electrodes are selected from the class consisting of steel, stainless steel, nickel, iron, Monel, Inconel, molybdenum and tantalum, wherein said powdered ceramic dielectric material is selected from the class consisting of the oxides and nitrides of aluminum, magnesium, silicon and boron, and wherein said powdered fusible binder material is selected from the group consisting of boron oxide and magnesium orthoborate.

8. The method of making a capacitor assembly of claim 7, wherein said conductive disc electrodes are tantalum, said powdered ceramic dielectric material is boron nitride and said fusible binder material consists of about 5 to about 50% by weight of said powder mixture of said ceramic dielectric material and said binder material.

9. The method of claim 2, wherein said supporting radial compression is effected by pouring a molten metal selected from the group consisting of bismuth and bismuth alloys substantially around said tube, said molten metal expanding upon solidifying so as to place said tube under substantially uniform radial compression whereby said tube is supported during compacting.

10. The method of making the capacitor assembly of claim 6, wherein said conductive disc electrodes are selected from the class consisting of steel, stainless steel, nickel, iron, Monel, Inconel, molybdenum and tantalum, wherein said powdered ceramic dielectric material is selected from the class consisting of the oxides and nitrides of aluminum, magnesium, silicon and boron, and wherein said powdered fusible binder material is selected from the group consisting of boron oxide and magnesium orthoborate.

11. The method of making the capacitor assembly of claim 10, wherein said conductive disc electrodes are tantalum, said powdered ceramic dielectric material is boron nitride and said fusible binder material consists of about 5 to about 50% by weight of said powder mixture of said ceramic dielectric material and said binder material.

12. The method of claim 6, further including the step of attaching conductive means to alternate ones of said electrodes.

References Cited

UNITED STATES PATENTS

| 2,398,088 | 4/1946 | Ehlers et al. | 317—258 |
| 2,844,845 | 7/1958 | Krall | 264—120 |
| 3,231,648 | 1/1966 | Eyre et al. | 264—120 |

FOREIGN PATENTS 995,177  6/1965  Great Britain.

JOHN F. CAMPBELL, Primary Examiner

R. B. LAZARUS, Assistant Examiner

U.S. Cl. X.R.

29—420.5; 156—288; 264—113, 120, 272